US012741641B2

(12) United States Patent
Ikedo

(10) Patent No.: US 12,741,641 B2
(45) Date of Patent: Sep. 22, 2026

(54) TRAVEL CONTROL DEVICE

(71) Applicant: TOYOTA JIDOSHA KABUSHIKI KAISHA, Toyota (JP)

(72) Inventor: Yuji Ikedo, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 18/750,248

(22) Filed: Jun. 21, 2024

(65) Prior Publication Data

US 2025/0136111 A1 May 1, 2025

(30) Foreign Application Priority Data

Nov. 1, 2023 (JP) ................................ 2023-187930

(51) Int. Cl.

*B60W 30/14* (2006.01)
*B60W 10/18* (2012.01)
*B60W 40/08* (2012.01)

(52) U.S. Cl.

CPC .......... *B60W 30/146* (2013.01); *B60W 10/18* (2013.01); *B60W 40/08* (2013.01); *B60W 2520/10* (2013.01); *B60W 2540/20* (2013.01); *B60W 2552/30* (2020.02); *B60W 2554/802* (2020.02); *B60W 2554/804* (2020.02); *B60W 2720/106* (2013.01)

(58) Field of Classification Search

CPC .... B60W 30/14; B60W 30/146; B60W 40/08; B60W 2552/30; B60W 2554/802; B60W 2554/804

USPC .......................................................... 701/93

See application file for complete search history.

(56) References Cited

U.S. PATENT DOCUMENTS

| | | | | |
|---|---|---|---|---|
| 8,355,851 | B2 | 1/2013 | Inoue et al. | |
| 8,370,040 | B2 | 2/2013 | Inoue et al. | |
| 8,417,430 | B2 | 4/2013 | Saeki | |
| 8,548,709 | B2 | 10/2013 | Morita | |
| 8,768,597 | B2 | 7/2014 | Kagawa | |
| 9,174,643 | B2 | 11/2015 | Aso | |
| 9,626,869 | B2 * | 4/2017 | Ariga .................... | B60W 30/16 |
| 10,017,178 | B2 | 7/2018 | Morimoto et al. | |
| 10,118,617 | B2 | 11/2018 | Urano et al. | |
| 10,486,698 | B2 | 11/2019 | Masui et al. | |

(Continued)

FOREIGN PATENT DOCUMENTS

| | | | | |
|---|---|---|---|---|
| DE | 102022132154 A1 * | 6/2023 | .......... | B60W 40/072 |
| JP | 2000-343980 A | 12/2000 | | |

(Continued)

*Primary Examiner* — Atul Trivedi

(74) *Attorney, Agent, or Firm* — SoraIP, Inc.

(57) ABSTRACT

A travel control device includes an automatic braking device that automatically brakes an own vehicle; and a driving support ECU configured to acquire information on one of a curvature and a curvature radius of a traveling road in front of the own vehicle, calculate a target vehicle speed of the own vehicle based on the information, and automatically decelerate the own vehicle by the automatic braking device so that the vehicle speed of the own vehicle becomes the target vehicle speed when the vehicle speed of the own vehicle exceeds the target vehicle speed, wherein the driving support ECU suppresses the execution of the automatic deceleration when it is estimated that the driver is going to overtake the preceding vehicle.

7 Claims, 6 Drawing Sheets

(56) References Cited

U.S. PATENT DOCUMENTS 11,092,967 B2* 8/2021 Akiyama ........ B60W 30/18163
11,978,129 B2* 5/2024 Cella .................... G06Q 50/188
2009/0037070 A1* 2/2009 Nakamura .......... B60W 40/076 701/96
2013/0297172 A1* 11/2013 Ariga .................... B60W 30/16 701/70
2016/0318518 A1* 11/2016 Suzuki .............. B60W 50/0097
2018/0118206 A1* 5/2018 Yamakado ............ B60W 30/14
2019/0295419 A1* 9/2019 Tosa ....................... G08G 1/166
2020/0017107 A1* 1/2020 Takahashi ........... B60W 30/162
2021/0139029 A1* 5/2021 Yamazaki ............. B60W 40/08
2021/0300364 A1 9/2021 Sadamura
2022/0041161 A1 2/2022 Belle et al.
2023/0001955 A1* 1/2023 Switkes .............. B60W 40/107
2023/0140569 A1* 5/2023 Foster ................. B60W 30/146 701/400
2023/0202473 A1* 6/2023 Shalev-Shwartz ........................... B60W 30/146 701/93
2023/0236037 A1* 7/2023 Heilbron .............. G08G 1/0133 701/402
2023/0303119 A1* 9/2023 Liu ................. B60W 30/18163
2023/0322208 A1* 10/2023 Rojas .................. B60W 50/085 701/41
2023/0322231 A1* 10/2023 Nishiguchi ..... B60W 30/18163 701/23
2024/0059285 A1* 2/2024 Ng ........................ B60W 50/14
2024/0067174 A1* 2/2024 Adam ............... B60W 60/0015
2024/0174264 A1* 5/2024 Wray .................... B60W 30/09
2024/0317226 A1* 9/2024 Nishimoto ............ B60W 30/16
2025/0065875 A1* 2/2025 Fukui .............. B60W 30/18163
2025/0136111 A1* 5/2025 Ikedo .............. B60W 30/18163
2025/0242801 A1* 7/2025 Shimanaka ........... B60W 30/09
2025/0368186 A1* 12/2025 Chiang ............... B60W 30/045

FOREIGN PATENT DOCUMENTS

JP 2016-182934 A 10/2016
JP 6691404 B2 4/2020
JP 2020-121575 A 8/2020
JP 2020179720 A * 11/2020 ............ B60W 30/16
JP 2021011254 A * 2/2021
JP 6844234 B2 * 3/2021
JP 2021060862 A * 4/2021
JP 2021-154858 A 10/2021
JP 2022164236 A * 10/2022
JP 2023-104560 A 7/2023
JP 2023153681 A * 10/2023 ............ B60W 30/16
WO 2012/098667 A1 7/2012
WO WO-2018173966 A1 * 9/2018 ...... B60W 30/18163
WO WO-2023026707 A1 * 3/2023 ........ B60W 60/0015

* cited by examiner

FIG. 1

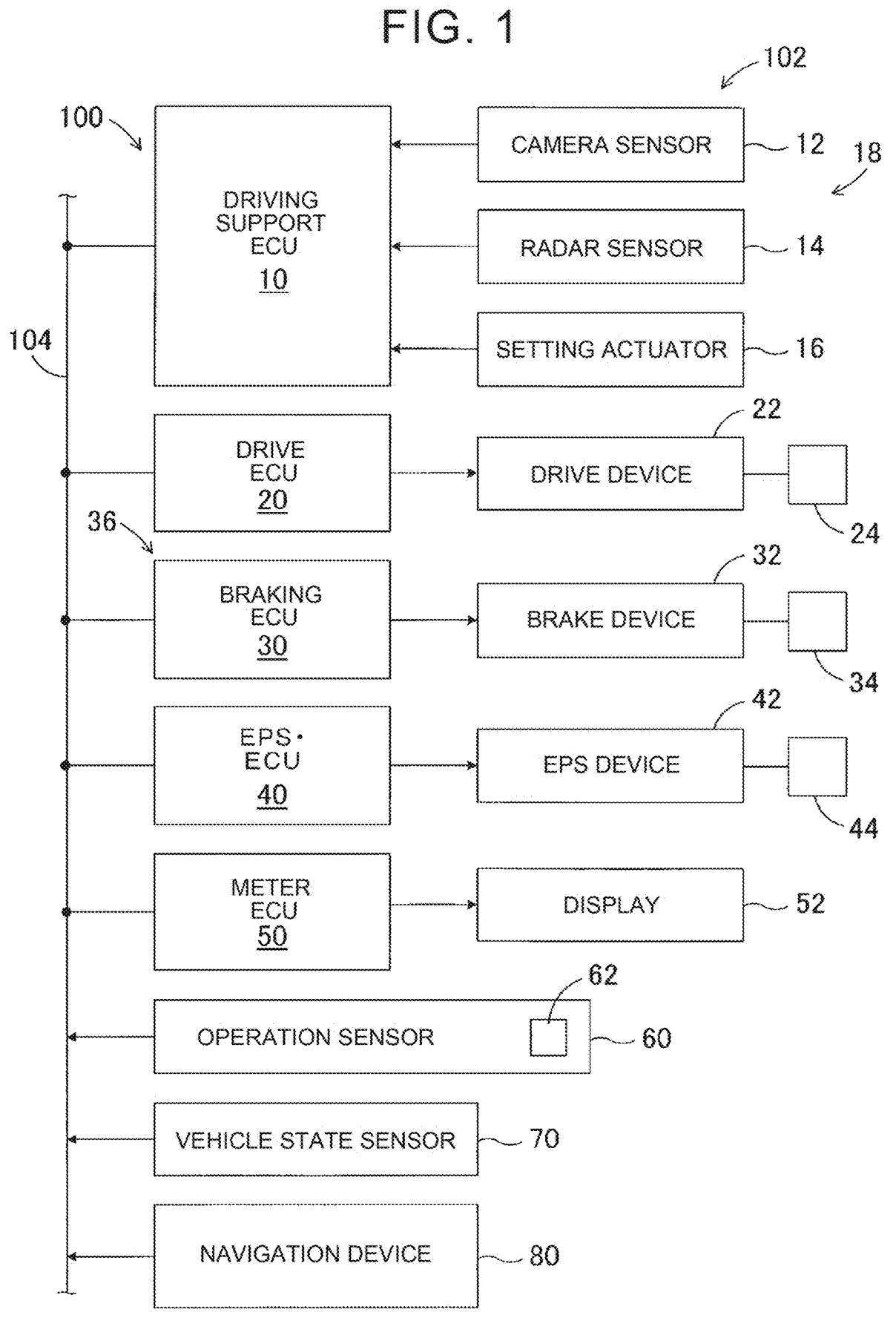

102
100
CAMERA SENSOR
12
18
DRIVING SUPPORT ECU
10
RADAR SENSOR
14
104
SETTING ACTUATOR
16
22
DRIVE ECU
20
DRIVE DEVICE
36
24
32
BRAKING ECU
30
BRAKE DEVICE
34
42
EPS・ECU
40
EPS DEVICE
44
METER ECU
50
DISPLAY
52
62
OPERATION SENSOR
60
VEHICLE STATE SENSOR
70
NAVIGATION DEVICE
80

START
S10
F1 = 1?
NO
YES
S20
COMPLETED OVERTAKING? (FIG. 3)
NO
RETURN
S50
YES
F1←0
S60
PRECEDING VEHICLE PRESENT?
YES
S70
WITH BLINKER LEVER OPERATION?
NO
A
NO
S90
CALCULATE THE CURVATURE C OF THE FRONT ROAD
YES
S80
F1←1
A
S100
C ≥ Cc?
NO
S110
YES
CALCULATE TARGET VEHICLE SPEED Vt
S112
F1 = 1?
NO
YES
S114
INCREASE AND CORRECT TARGET VEHICLE SPEED Vt
RETURN
TO S120

TRAVEL CONTROL DEVICE

CROSS-REFERENCE TO RELATED APPLICATION

This application claims priority to Japanese Patent Application No. 2023-187930 filed on Nov. 1, 2023, incorporated herein by reference in its entirety.

BACKGROUND

1. Technical Field

The present disclosure relates to a travel control device that performs deceleration control for a vehicle such as an automobile during curve travel.

2. Description of Related Art

As a travel control device for a vehicle such as an automobile, a travel control device that performs deceleration control during curve travel is known. For example, Japanese Patent No. 06691404 (JP 06691404 B) describes a travel control device that recognizes a curve ahead of a vehicle and automatically decelerates the vehicle when the vehicle speed is excessively high while the vehicle enters the curve.

It is also known that, in deceleration control during curve travel, a target vehicle speed of a vehicle is calculated based on a curvature or a curvature radius of a traveling road ahead of the vehicle and, when the vehicle speed of the vehicle exceeds the target vehicle speed, the vehicle is automatically decelerated so that the vehicle speed of the vehicle reaches the target vehicle speed.

With the travel control device that performs the deceleration control during the curve travel, it is possible to prevent the vehicle speed during the curve travel from becoming excessively high, and to perform drive assist so that the vehicle can safely and stably travel along the curve.

SUMMARY

In the related-art travel control device such as the device described in JP 06691404 B, however, the vehicle is automatically decelerated when the vehicle speed is high during the curve travel of the vehicle. Therefore, even if the driver accelerates to overtake a preceding vehicle during the curve travel, the vehicle is automatically decelerated when the vehicle speed increases. Thus, there is a possibility that the vehicle cannot overtake the preceding vehicle.

The present disclosure provides a travel control device that performs deceleration control during curve travel, and that is improved to reduce a possibility that a target vehicle cannot overtake a preceding vehicle during curve travel.

One aspect of the present disclosure provides a travel control device including an automatic braking device configured to automatically brake a target vehicle, and a control unit configured to acquire information on one of a curvature and a curvature radius of a traveling road ahead of the target vehicle, calculate a target vehicle speed of the target vehicle based on the information, and execute, when a vehicle speed of the target vehicle exceeds the target vehicle speed, automatic deceleration on the target vehicle by the automatic braking device to control the vehicle speed of the target vehicle to reach the target vehicle speed.

The control unit is configured to suppress execution of the automatic deceleration when the control unit estimates that a driver is to overtake a preceding vehicle.

In the above configuration, the information on one of the curvature and the curvature radius of the traveling road ahead of the target vehicle is acquired, the target vehicle speed of the target vehicle is calculated based on the information, and when the vehicle speed of the target vehicle exceeds the target vehicle speed, the automatic deceleration on the target vehicle is executed to control the vehicle speed of the target vehicle to reach the target vehicle speed. However, the execution of the automatic deceleration is suppressed when the control unit estimates that the driver is to overtake the preceding vehicle.

Therefore, the deceleration of the target vehicle is suppressed when the control unit estimates that the driver is to overtake the preceding vehicle. Thus, even if the driver accelerates to overtake the preceding vehicle during the curve travel and the vehicle speed increases, the automatic deceleration of the target vehicle is suppressed. Accordingly, it is possible to reduce the possibility that the target vehicle cannot overtake the preceding vehicle due to the automatic deceleration.

When the preceding vehicle is present ahead of the target vehicle and the driver does not intend to overtake the preceding vehicle, and when the driver operates a blinker lever and wants to change the route instead of overtaking, the target vehicle may be decelerated so that the vehicle speed reaches the target vehicle speed.

In the one aspect of the present disclosure, the control unit may be configured to suppress the execution of the automatic deceleration by one of not executing the automatic deceleration and correcting the target vehicle speed to increase.

In the above aspect, the execution of the automatic deceleration is suppressed by one of not executing the automatic deceleration and correcting the target vehicle speed to increase. In the case where the execution of the automatic deceleration is suppressed by not executing the automatic deceleration, the target vehicle is not automatically decelerated during the curve travel. Therefore, it is possible to effectively reduce the possibility that the target vehicle cannot overtake the preceding vehicle due to the automatic deceleration. In the case where the execution of the automatic deceleration is suppressed by correcting the target vehicle speed to increase, it is possible to prevent the vehicle speed of the target vehicle during the curve travel from becoming excessively high over the target vehicle speed after the increase by correction while ensuring the possibility that the target vehicle will accelerate and overtake the preceding vehicle.

In the one aspect of the present disclosure, the control unit may be configured to estimate that the driver is to overtake the preceding vehicle when determination is made that the preceding vehicle is present within a predetermined distance range ahead of the target vehicle and that a blinker lever is operated by the driver toward a lane where the driver is to overtake the preceding vehicle.

In the above aspect, it can be estimated that the driver is to overtake the preceding vehicle when the preceding vehicle is present within the predetermined distance range ahead of the target vehicle and that the blinker lever is operated by the driver toward the lane where the driver is to overtake the preceding vehicle.

In the one aspect of the present disclosure, the control unit may be configured to terminate suppression of the execution of the automatic deceleration when determination is made that overtaking of the preceding vehicle is completed.

In the above aspect, the suppression of the execution of the automatic deceleration is terminated when determination is made that the overtaking of the preceding vehicle is completed. Therefore, it is possible to prevent the suppression of the execution of the automatic deceleration from being unnecessarily continued despite the completion of the overtaking of the preceding vehicle.

Further, in the one aspect of the present disclosure, the control unit may be configured to terminate the suppression of the execution of the automatic deceleration when an elapsed period from a time point at which the control unit estimates that the driver is to overtake the preceding vehicle is equal to or larger than a reference value while determination is not made that the overtaking of the preceding vehicle is completed.

In the above aspect, the suppression of the execution of the automatic deceleration is terminated when the elapsed period from the time point at which the control unit estimates that the driver is to overtake the preceding vehicle is equal to or larger than the reference value while determination is not made that the overtaking of the preceding vehicle is completed. Therefore, it is possible to prevent the suppression of the execution of the automatic deceleration from being unnecessarily continued when the overtaking of the preceding vehicle is not completed, as in the case where the target vehicle changes the lane without returning to the original lane.

In the above description, other objects, other features, and accompanying advantages of the present disclosure will be readily understood from the following description of an embodiment of the present disclosure made with reference to the drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic configuration diagram illustrating a travel control device according to an embodiment;

DETAILED DESCRIPTION OF EMBODIMENTS

Figure 2:
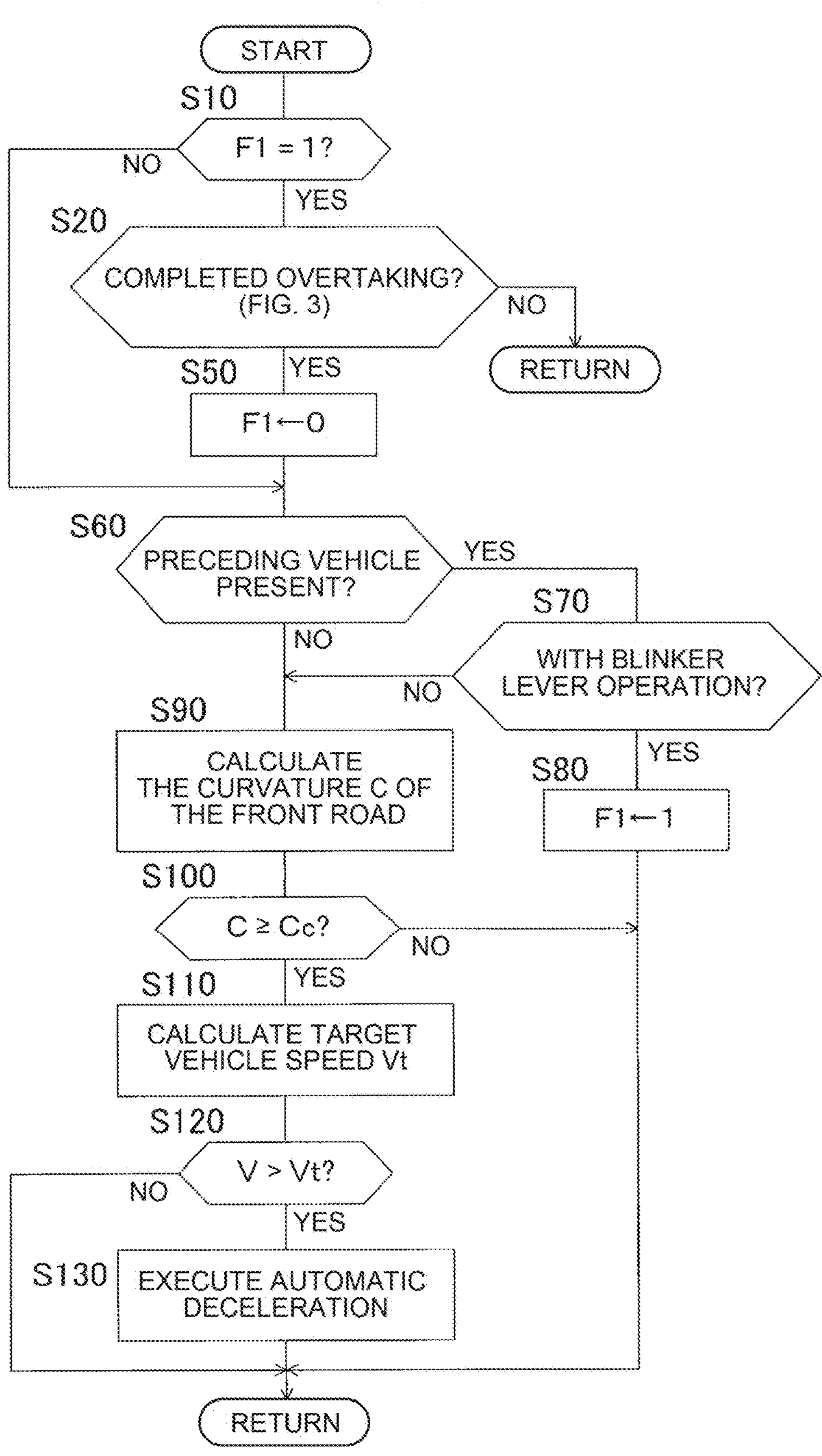
FIG. 2 is a flowchart illustrating a deceleration control routine during curve running according to the first embodiment.

Hereinafter, a travel control device according to an embodiment of the present disclosure will be described in detail with reference to the accompanying drawings.

As shown in FIG. 1, a travel control device 100 according to an embodiment of the present disclosure is applied to vehicle 102 and includes a driving support ECU 10. The vehicle 102 is a vehicle capable of automated driving, and includes a drive ECU 20, a braking ECU 30, an electric power steering ECU 40, and a meter ECU 50. ECU means an electronic control unit comprising a microcomputer as its main part. In the following explanation, the electric power steering is referred to as an EPS.

A microcomputer of each ECU includes a central processing unit (CPU), a read-only memory (ROM), a random-access memory (RAM), a readable and writable non-volatile memory (N/M), an interface (I/F), and the like. The CPU realizes various functions by executing instructions (programs, routines) stored in the ROM. Furthermore, these ECU are connected to each other in a data-exchangeable manner via a Controller Area Network (CAN) 104. Therefore, detected values of sensors (including switches) connected to a specific ECU are transmitted to other ECUs as well.

The driving support ECU 10 is a central control device that performs driving assistance travel control such as deceleration control and lane keeping control during curve travel. In an embodiment, the driving support ECU 10 cooperates with other ECU to perform deceleration control when the vehicle 102 travels in a curve, as will be described later.

A camera sensor 12, a radar sensor 14, and a setting operation device 16 are connected to the driving support ECU 10. The camera sensor 12 and radar sensor 14 each include a plurality of camera devices and a plurality of radar devices. The camera sensor 12 and the radar sensor 14 function as a target information acquisition device 18 that acquires target information around the vehicle 102.

Each camera device of the camera sensor 12 includes a camera unit that captures an image of the surroundings of the vehicle 102, and a recognition unit that analyzes image data obtained by capturing an image by the camera unit and recognizes a target such as a white line of a road or another vehicle, although not shown in the drawing. The recognition unit supplies information about the recognized target to the driving support ECU 10 at predetermined intervals.

Each radar device of the radar sensor 14 includes a radar transceiver and a signal processor (not shown). The radar transmitting/receiving unit emits a radio wave (hereinafter, referred to as "millimeter wave") in a millimeter wave band, and receives a millimeter wave (that is, a reflected wave) reflected by a three-dimensional object (for example, another vehicle, a bicycle, or the like) existing in a radiation range. The signal processor supplies information indicating a distance between the target vehicle and the three-dimensional object, a relative speed between the target vehicle and the three-dimensional object, a relative position (direction) of the three-dimensional object with respect to the target vehicle, and the like to the driving support ECU 10 at predetermined time intervals on the basis of a phase difference between the transmitted millimeter wave and the received reflected wave, an attenuation level of the reflected wave, a time period from the transmission of the millimeter wave to the reception of the reflected wave, and the like. In addition, instead of the radar sensor 14, or in addition to the radar sensor 14, a light detection and ranging (LiDAR) may be used.

The setting operation device 16 is provided at a position that can be operated by a driver, such as a steering wheel (not shown in FIG. 1), and is operated by the driver. Although not shown in FIG. 1, the setting operation device 16 includes a driving assistance switch. As will be described later, the driving support ECU 10 performs deceleration control during the traveling of the curve when the driving assistance switch is on.

A drive device 22 that accelerates the vehicle 102 by applying a driving force to the driving wheels 24 is connected to the drive ECU 20. In a normal state, the drive ECU 20 controls the drive device 22 so that the driving force generated by the drive device 22 changes in response to a driving operation by the driver, and when a command signal is received from the driving support ECU 10, controls the drive device 22 based on the command signal.

A braking device 32 is connected to the braking ECU 30 to decelerate the vehicle 102 by braking by applying a braking force to the wheels 34. The braking ECU 30 controls the braking device so that the braking force generated by the braking device 32 changes in response to a braking operation by the driver in a normal state. In addition, upon receiving the command signal from the driving support ECU 10, the braking ECU 30 performs the automated braking by controlling the braking device 32 based on the command signal.

Thus, the braking ECU 30 and the braking device 32 cooperate with each other to function as an automatic braking device 36. When braking force is applied to the wheels by deceleration control or the like during the curve running, a brake lamp (not shown in FIG. 1) is turned on.

An EPS device 42 is connected to EPS•ECU 40. EPS•ECU 40 controls the steering assist torque by controlling EPS device 42 in a manner known in the art based on the steering torque and the vehicle speed, thereby reducing the steering burden on the driver. EPS•ECU 40 can steer the steered wheels 44 as needed by controlling EPS device 42.

The meter ECU 50 is connected with a touch panel type display 52 that displays a state of control by the driving support ECU 10 and the like. The display 52 may be, for example, a multi-information display in which meters and various types of information are displayed, or may be a display of a navigation device 80 described later. As will be described later, when receiving a signal from the driving support ECU 10, the display 52 displays the state of the deceleration control during the traveling of the curve.

The driving operation sensor 60 and the vehicle state sensor 70 are also connected to CAN 104. Information detected by the driving operation sensor 60 and the vehicle state sensor 70 (hereinafter referred to as sensor information) is transmitted to the CAN 104. The sensor information transmitted to the CAN 104 can be appropriately used in each ECU. Note that the sensor information may be information of a sensor connected to a specific ECU, and may be transmitted from the specific ECU to the CAN 104.

The driving operation sensor 60 includes a drive operation amount sensor that detects an operation amount of an accelerator pedal, a braking operation amount sensor that detects a master cylinder pressure or a depression force applied to a brake pedal, and a brake switch that detects whether the brake pedal is operated. The driving operation sensor 60 includes a steering angle sensor for detecting a steering angle, a steering torque sensor for detecting a steering torque, and the like. Further, the driving operation sensor 60 includes a switch for detecting an operation of the blinker lever that is operated when the driver desires a lane change or the like.

The vehicle state sensor 70 includes a vehicle speed sensor that detects the vehicle speed V of the vehicle 102, a longitudinal acceleration sensor that detects longitudinal acceleration of the vehicle, a lateral acceleration sensor that detects lateral acceleration of the vehicle, a yaw rate sensor that detects a yaw rate of the vehicle.

In addition, the navigation device 80 is also connected to CAN 104. The navigation device 80 includes a global positioning system (GPS) receiver that detects the position of the vehicle 102, a storage device that stores map information and road information, and a communication device that acquires the latest information of the map information and the road information from the outside. In particular, the road information may include information on the curvature or the curvature radius of the curved road. Note that the navigation device 80 may not be provided.

First Embodiment

Figure 3:
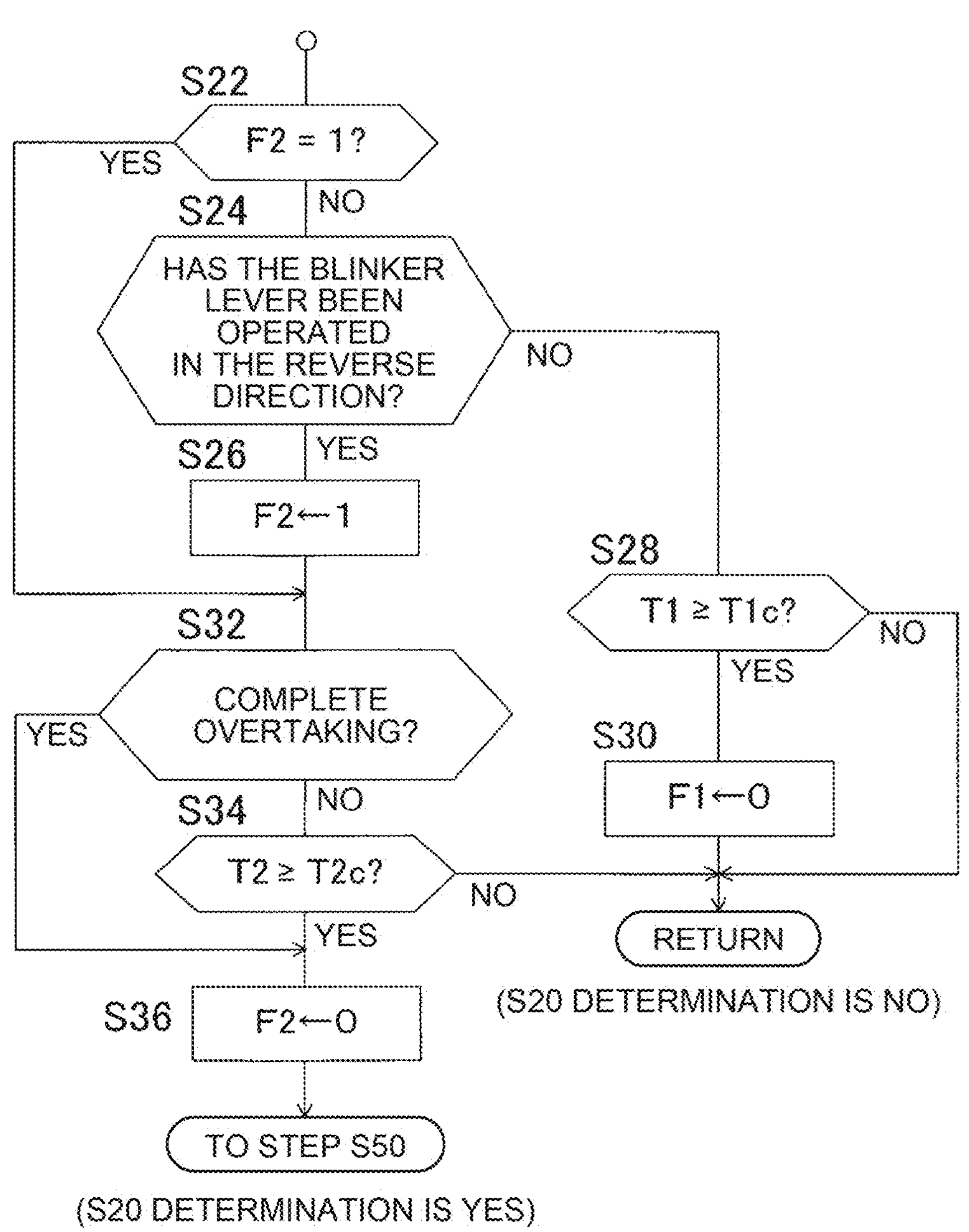
FIG. 3 is a flow chart illustrating sub-routines performed in S20 of the flow chart shown in FIG. 2.

In the first embodiment, ROM of the driving support ECU 10 stores a deceleration control program for traveling in a curve corresponding to the flow charts illustrated in FIGS. 2 and 3.

Deceleration Control During Curve Travel in the First Embodiment

Next, deceleration control during curve traveling in the first embodiment will be described with reference to the flowcharts shown in FIGS. 2 and 3. The deceleration control in the curve traveling according to the flow charts shown in FIGS. 2 and 3 is repeatedly executed at predetermined intervals by CPU of the driving support ECU 10 in a situation where the driving assistance switch is on. Note that at the beginning of the control according to the flow charts shown in FIGS. 2 and 3, the flags F1 and F2 are reset to 0. The same applies to the second embodiment described later.

First, in S10, CPU determines whether or not the flag F1 is 1, that is, whether or not the driver has already estimated that the driver is going to overtake the preceding vehicles. When a negative determination is made, the present control proceeds to S60, and when an affirmative determination is made, the present control proceeds to S20.

In S20, CPU determines whether or not the overtaking of the target vehicle 102 has been completed, for example, according to the sub-routine illustrated in FIG. 3. When a negative determination is made, the present control ends once, and when an affirmative determination is made, the flag F1 is reset to 0 in S50, and then the present control proceeds to S60.

In S60, CPU determines whether or not there is a preceding vehicle in a predetermined range ahead of the target vehicle 102 in the host lane. When a negative determination is made, the present control proceeds to S90, and when an affirmative determination is made, the present control proceeds to S70.

In S70, CPU determines whether or not the blinker lever is operated toward the lane that can be overtaken by the driver on the basis of on/off of a switch for detecting the operation of the blinker lever of the driving operation sensor 60. When a negative determination is made, the present control proceeds to S90, and when an affirmative determination is made, the flag F1 is set to 1 in S80, and then the present control is terminated once.

In S90, CPU calculates the curvature C of the traveling road ahead based on the images in front of the target vehicle 102 captured by the camera sensor 12. The curvature C of the traveling road may be calculated based on the road information stored in the navigation device 80, or may be obtained based on the curvature information attached to the road information stored in the navigation device 80. Further, the curvature C of the traveling road may be estimated based on the vehicle speed and the steering angle, or may be estimated based on a change in the curvature of the traveling road at the current position estimated based on the vehicle speed and the lateral acceleration of the vehicle. Further, the curvature C of the traveling road may be determined based on the road information transmitted from the communication device installed on the road side. The curvature C of the road is calculated as a positive value regardless of the direction of the road curve.

In S100, CPU determines whether or not the curvature C of the traveling path is equal to or greater than the reference value Cc (positive constant). When a negative determination is made, the present control ends once, and when an affirmative determination is made, the present control proceeds to S110.

In S110, CPU calculates the target vehicle speed Vt at the time of traveling on the curve based on the curvature C of the traveling road so as to be lower as the curvature C of the traveling road is larger. The target vehicle speed Vt may be calculated based on the relation between the curvature C of the traveling road and the target vehicle speed obtained experimentally or learned, for example, in order for the vehicle to travel stably and safely on the curve. When the following inter-vehicle distance control is performed, the target vehicle speed Vt may be calculated to be equal to or lower than the set vehicle speed of the following inter-vehicle distance control.

In S120, CPU determines whether or not the vehicle speed V of the target vehicle 102 exceeds the target vehicle speed Vt, that is, whether or not automatic deceleration during the curve travel of the automatic braking device 36 is required. When a negative determination is made, the present control ends once, and when an affirmative determination is made, the present control proceeds to S130.

In S130, CPU calculates a target deceleration Gbt for setting the vehicle speed V of the target vehicle 102 to the target vehicle speed Vt, and outputs a command to the braking ECU 30. As a result, CPU performs the control of the auto-deceleration of the target vehicle so that the deceleration of the target vehicle becomes the target deceleration Gbt. The target deceleration Gbt may be calculated as a deceleration that sets the vehicle speed V of the target vehicle to the target vehicle speed Vt at a preset deceleration time.

In S22 of the sub-routine illustrated in FIG. 3, CPU determines whether or not the flag F2 is 1, that is, whether or not it has been determined that the driver has operated the latter half of the overtaking. When an affirmative determination is made, the present control proceeds to S32, and when a negative determination is made, the present control proceeds to S24.

In S24, CPU determines whether or not the blinker lever is operated in a direction opposite to the operation direction determined by the driver on the side of the original lane, that is, S60, on the basis of on/off of the switch for detecting the operation of the blinker lever 62. When a negative determination is made, the present control proceeds to S28, and when an affirmative determination is made, the flag F2 is set to 1 in S26, and then the present control proceeds to S32.

In S28, CPU determines whether or not the elapsed time T1 from a point in time when an affirmative determination is made in S70, that is, a point in time when the driver estimates that the driver is going to overtake the preceding vehicle is equal to or greater than a reference value T1c (positive constant). When a negative determination is made, the present control is terminated once, and when an affirmative determination is made, the flag F1 is reset to 0 in S30, and then the present control is terminated once.

In S32, CPU determines whether or not the overtaking of the target vehicle 102 has been completed. When an affirmative determination is made, the present control proceeds to S36, and when a negative determination is made, the present control proceeds to S34. In this case, for example, it may be determined that the overtaking has been completed when it is determined that the target vehicle is moving forward of the original preceding vehicle, returns to the original lane, and travels in the original lane equal to or longer than the reference time (positive constant) based on the detection result of the camera sensor 12.

In S34, CPU determines whether or not the elapsed time T2 from the point in time when an affirmative determination is made in S24, that is, the point in time when the driver estimates that the driver is going to return to the original lane is equal to or greater than the reference value T2c (positive constant). When a negative determination is made, the present control is terminated once, and when an affirmative determination is made, the flag F2 is reset to 0 in S36, and then the present control is terminated once.

In S34, it may be determined whether or not the elapsed time T1 from the time point at which the driver estimates that the driver is going to overtake the preceding vehicle is equal to or greater than the reference value T1c (positive constant). Even then, when a negative determination is made, although not shown in FIG. 3, the flag F2 is reset to 0, and then the present control is terminated once, and when an affirmative determination is made, the present control may proceed to S36.

As illustrated in FIG. 3, when S36 is executed, S20 determination is affirmative, and when a negative determination is made in S28 or S34 or when S30 is executed, S20 determination is negative.

Figure 5:
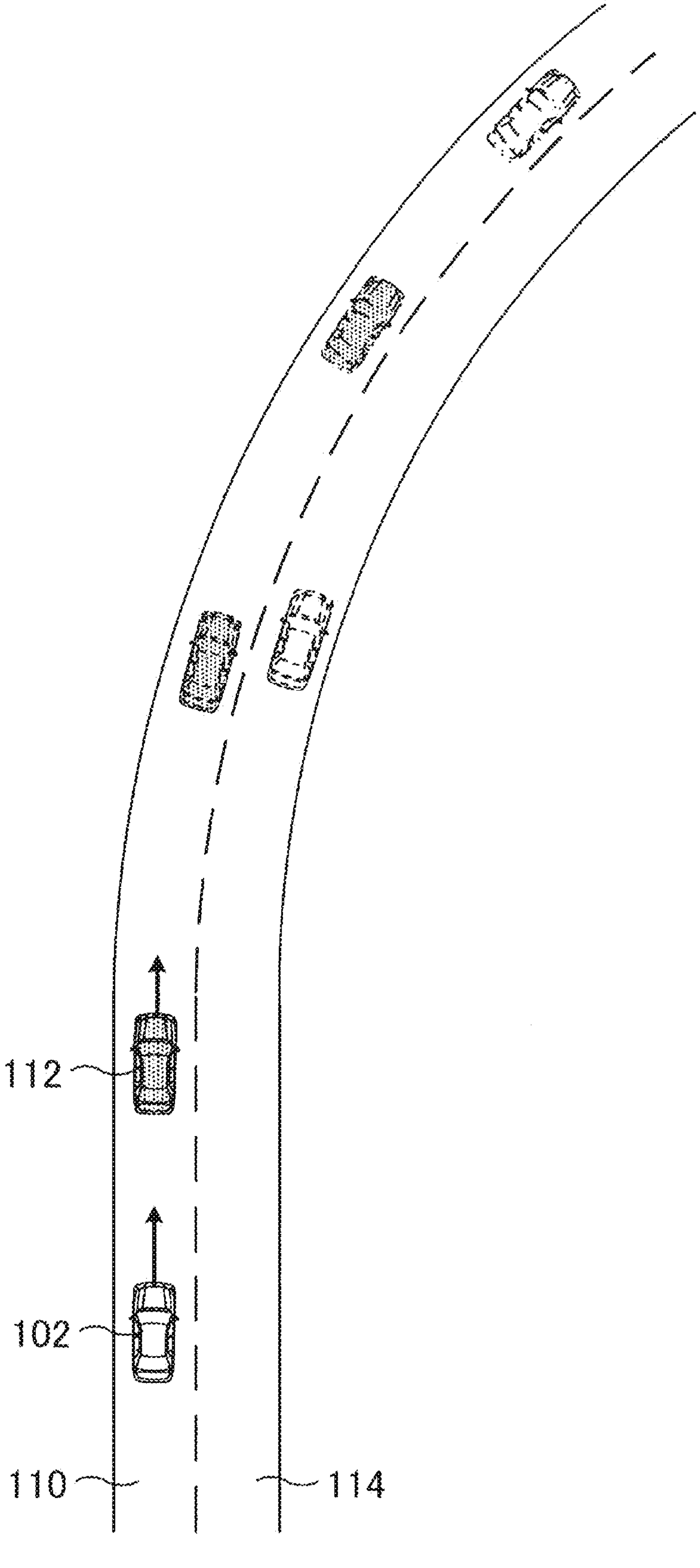
FIG. 5 is a diagram illustrating a case where the target vehicle overtakes a preceding vehicle.

When the Target Vehicle Overtakes the Preceding Vehicle (FIG. 5)

As shown in FIG. 5, when the target vehicle 102 overtakes the preceding vehicle 112 traveling on the host lane 110, an affirmative determination is made in S60 and S70, and the flag F1 is set to 1 in S80. Therefore, since an affirmative determination is made in S10 and a negative determination is made in S20 until the overtaking is completed, S130, that is, the auto-deceleration of the target vehicle is not performed. Therefore, it is possible to effectively reduce the possibility that the preceding vehicle cannot be overtaken due to the automatic deceleration.

In FIG. 5, a broken line indicates a situation in which the target vehicle 102 has moved to the adjacent lane 114 in order to overtake the preceding vehicle 112, and a virtual line indicates a situation in which the target vehicle 102 has completed overtaking and has moved to the front of the vehicle 112 in the host lane 110.

Figure 6:
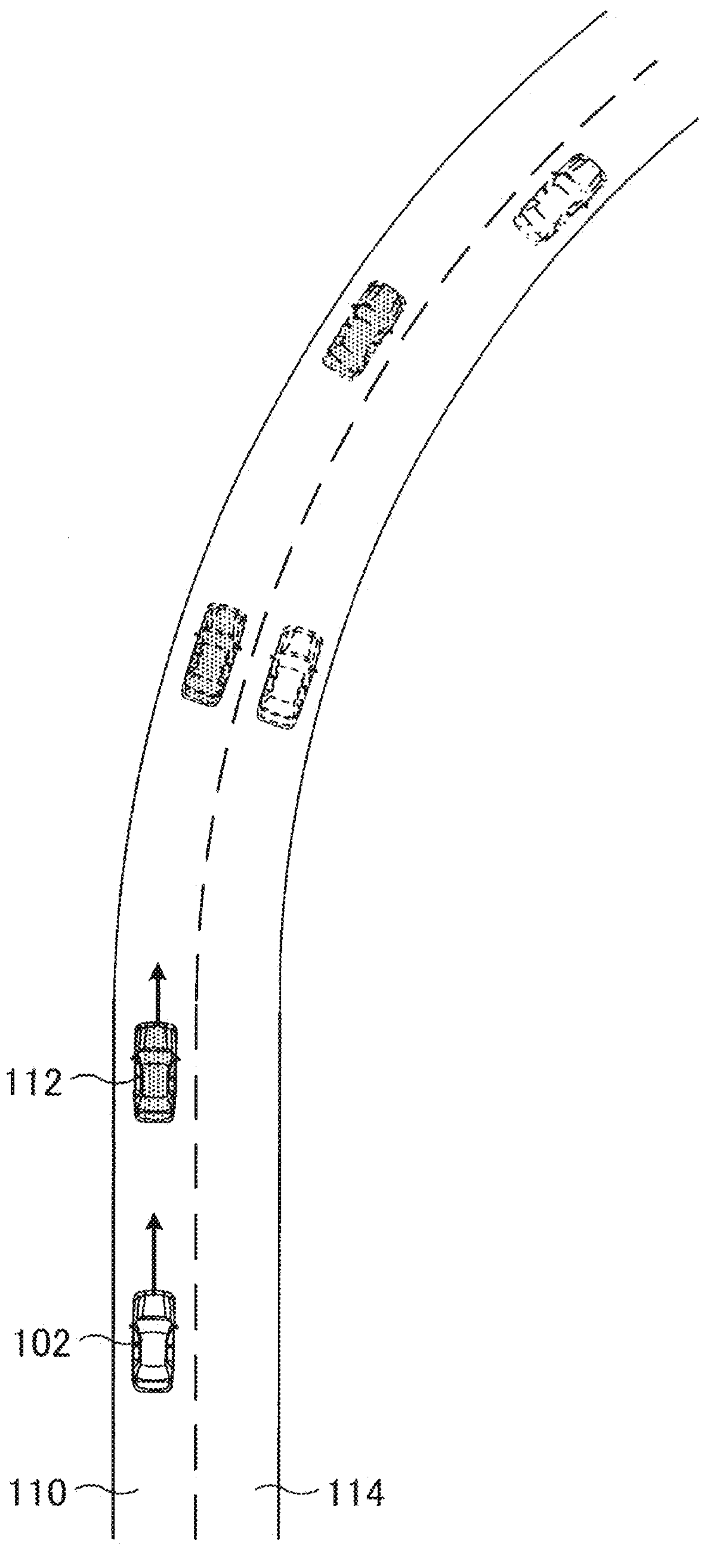
FIG. 6 is a diagram illustrating a case where the target vehicle changes the lane.

When the subject vehicle changes the lane (FIG. 6)

As shown in FIG. 6, when the target vehicle 102 does not overtake the preceding vehicle 112 but changes the lane from the host lane 110 to the adjacent lane 114, an affirmative determination is made in S60 and S70, and the flag F1 is set to 1 in S80. Therefore, since an affirmative determination is made in S10 and a negative determination is made in S20 until the lane change is completed, S130, that is, the auto-deceleration of the target vehicle is not performed. Therefore, it is possible to effectively reduce the possibility that the speed cannot be increased at the time of lane change due to the automatic deceleration.

In FIG. 6, a broken line indicates a situation in which the target vehicle 102 moves to the adjacent lane 114 on the side of the preceding vehicle 112 and completes the lane change, and a virtual line indicates a situation in which the target vehicle travels on the adjacent lane 114 ahead of the vehicle 112.

Second Embodiment

Figure 4:
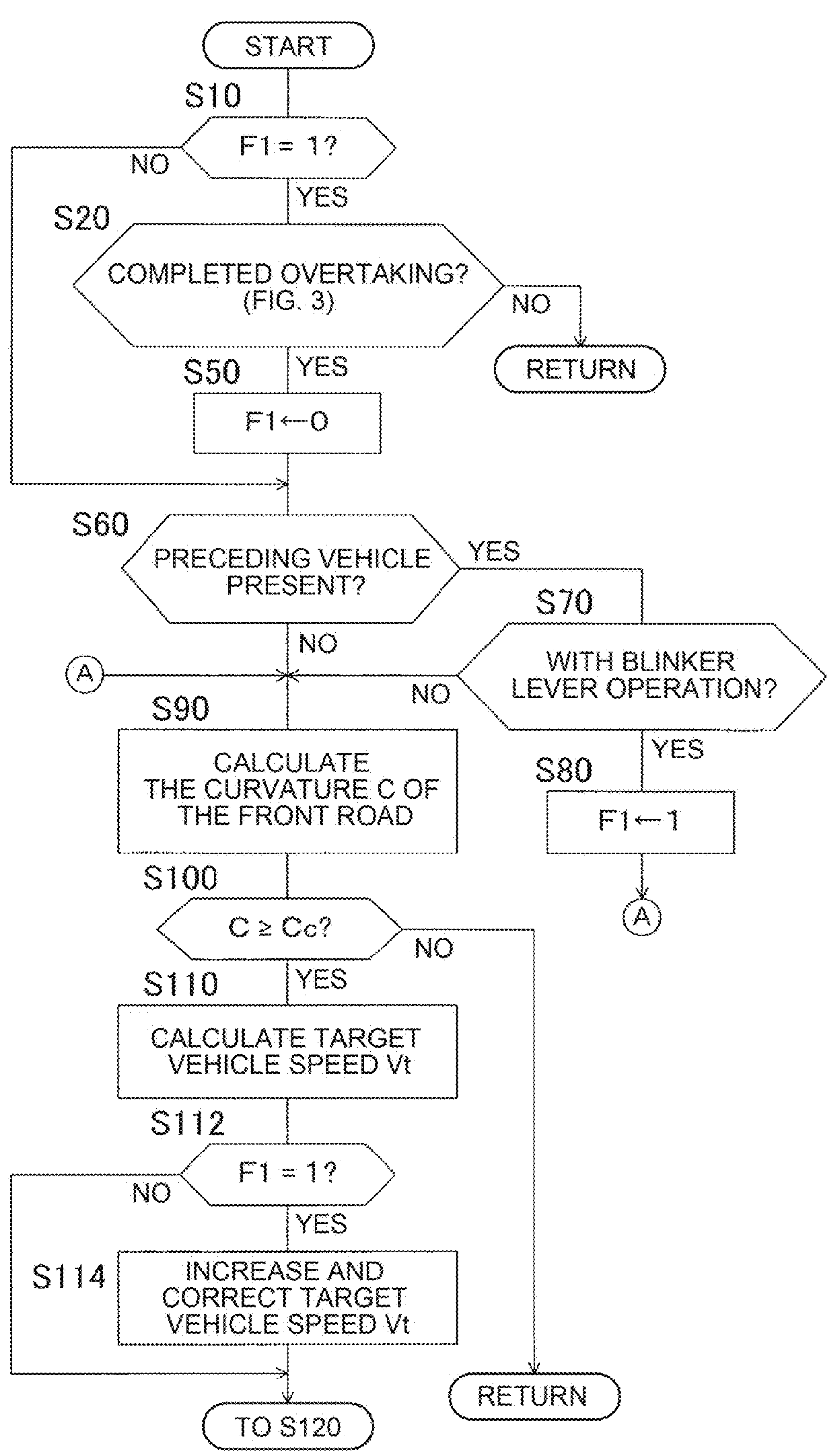
FIG. 4 is a flowchart showing a main part of a deceleration control routine during curve traveling in the second embodiment.

In the second embodiment, ROM of the driving support ECU 10 stores a deceleration control program for traveling on a curve corresponding to the flow charts illustrated in FIGS. 4 and 3.

Deceleration Control During Curve Travel in the Second Embodiment

As can be seen from comparing FIG. 4 with FIG. 2, the steps other than S20, S80, S112 and S114 are performed in the same manner as in the first embodiment.

In the second embodiment, when a negative determination is made in S20, the present control proceeds to S90, and when S80 is completed, the present control proceeds to S90. Further, when S110 is completed, S112 is executed. In S112, as in S10, it is determined whether or not the flag F1 is 1. When a negative determination is made, the present control proceeds to S120, and when an affirmative determination is made, S114 increases and corrects the target vehicle speed Vt, and then the present control proceeds to S120.

The increase correction of the target vehicle speed Vt may be performed by adding the correction amount ΔVt to the target vehicle speed Vt calculated in S110, or may be performed by multiplying the target vehicle speed Vt calculated in S110 by the correction coefficient K larger than 1. The correction amount ΔVt and the correction coefficient K may be positive constants, and may be variably set in accordance with the vehicle speed V so as to increase as the vehicle speed V of the target vehicle increases.

According to the second embodiment, when the flag F1 is 1, that is, when it is estimated that the driver is going to overtake the preceding vehicle, the target vehicle speed Vt is increased and corrected. Therefore, it is difficult to make an affirmative determination in S120, and it is difficult to execute S130 of steps. Therefore, it is possible to suppress the vehicle speed of the target vehicle during the curve traveling from becoming excessive beyond the target vehicle speed after the correction of the increase while ensuring the possibility that the target vehicle will accelerate and overtake the preceding vehicle.

As can be seen from the above explanation, according to the first and second embodiments, information on one of the curvature and the curvature radius of the traveling road ahead of the target vehicle 102 is acquired (S90), and the target vehicle speed Vt of the target vehicle is calculated based on the information (S110). Further, when the vehicle speed V of the target vehicle exceeds the target vehicle speed Vt (S120), the auto-deceleration of the target vehicle is executed so that the vehicle speed of the target vehicle becomes the target vehicle speed (S130). However, when it is estimated that the driver is going to overtake the preceding vehicles (S10, S20), the auto-deceleration is suppressed.

Therefore, the deceleration of the target vehicle is suppressed when the control unit estimates that the driver is to overtake the preceding vehicle. Therefore, even if the driver accelerates to overtake the preceding vehicle during the curve traveling and the vehicle speed increases, it is possible to reduce the possibility that the vehicle cannot overtake the preceding vehicle due to the automatic deceleration because the vehicle is suppressed from being automatically decelerated.

Further, according to the first and second embodiments, it is estimated that the driver is going to overtake the preceding vehicle when it is determined that the leading vehicle is within a predetermined range ahead of the target vehicle and the blinker lever is operated toward the lane that can be overtaken by the driver (S60, S70). Therefore, when the leading vehicle is within a predetermined distance range ahead of the target vehicle and the blinker lever is operated toward the lane that can be overtaken by the driver, it can be estimated that the driver is trying to overtake the leading vehicle.

Even if there is a preceding vehicle in a predetermined distance range ahead of the target vehicle, when it is not determined that the blinker lever is operated toward the lane that can be overtaken by the driver, it is not estimated that the driver is trying to overtake the preceding vehicle. Therefore, in a case where the target vehicle travels in a curve following the preceding vehicle, when the vehicle speed of the target vehicle exceeds the target vehicle speed, the automatic deceleration of the target vehicle is executed so that the vehicle speed of the target vehicle becomes the target vehicle speed.

Further, even if it is determined that the leading vehicle is within a predetermined distance range ahead of the target vehicle and the blinker lever is operated by the driver, if the blinker lever is operated in a direction in which overtaking is impossible, it is not estimated that the driver is trying to overtake the leading vehicle. Therefore, in a case where the target vehicle moves to a side road in a situation where the target vehicle travels in a curve, the automatic deceleration of the target vehicle is not unnecessarily suppressed.

Further, according to the first and second embodiments, when it is determined that the overtaking of the preceding vehicles is completed (S20), the suppression of the auto-deceleration is released (S50). Therefore, it is possible to prevent the suppression of the execution of the automatic deceleration from being unnecessarily continued despite the completion of the overtaking of the preceding vehicle.

Further, according to the first and second embodiments, when the elapsed time from the time point at which the driver estimates that the driver is going to overtake the preceding vehicle becomes equal to or more than the reference value (S34), the suppression of the execution of the auto-deceleration is cancelled even if it is not determined that the overtaking of the preceding vehicle is completed. Therefore, it is possible to prevent the suppression of the execution of the automatic deceleration from being unnecessarily continued when the overtaking of the preceding vehicle is not completed, as in the case where the vehicle changes the lane without returning to the original lane.

In particular, according to the first and second embodiments, after it is estimated that the driver is going to overtake the preceding vehicle, and after it is determined by the driver that the blinker lever 62 has been operated toward the original lane (S24), it is determined whether or not the overtaking of the preceding vehicle has been completed (S32). Therefore, it is possible to appropriately determine whether or not the overtaking of the preceding vehicle has been completed as compared with a case where it is not determined whether or not the blinker lever 62 has been operated by the driver toward the original lane.

Further, according to the first and second embodiments, since the execution of the automatic deceleration is suppressed not only in the case where the target vehicle overtakes the preceding vehicle but also in the case where the lane change is performed, it is possible to prevent the acceleration when the target vehicle changes the lane from being hindered.

The present disclosure has been described in detail above with respect to specific embodiments. However, it is obvious to those skilled in the art that the present disclosure is not limited to the above-described embodiments, and various other embodiments are possible within the scope of the present disclosure.

For example, in the first and second embodiments described above, in S90, the curvature C of the traveling road ahead is calculated, and in S100, it is determined whether or not the curvature C of the traveling road is equal to or greater than the reference value Cc. Further, in S110, the target vehicle speed Vt at the time of traveling on the curve is calculated based on the curvature C of the traveling road so as to be lower as the curvature C of the traveling road is larger. However, in S90, the curvature radius R of the forward travel path may be calculated, and in S100, it may be determined whether or not the curvature radius R of the travel path is equal to or less than the reference value Rc. In this case, in S110, the target vehicle speed Vt during the traveling of the curve may be calculated based on the curvature radius R of the traveling road so that the smaller the curvature radius R of the traveling road is, the lower.

In the first embodiment described above, in S100, it is determined whether or not the curvature C of the traveling path is equal to or greater than the reference value Cc, and when a negative determination is made, the present control is temporarily ended. However, when S100 is omitted and the curvature C of the traveling path is equal to or larger than the reference value Cc, the target vehicle speed Vt during the traveling of the curve may be calculated to a value at which a negative determination is made in S120 in S110, for example, as shown in 300 km/h.

In the first and second embodiments described above, even when the driver is trying to change the lane, the vehicle is prevented from being automatically decelerated until the elapsed time T1 becomes equal to or larger than the reference value T1c. However, the automatic deceleration of the target vehicle in the case where the driver is trying to change the lane may be omitted.

Furthermore, in the first and second embodiments described above, the reference values T1c and T2c in the determination of S28 and S34 are positive constants. However, at least one of these reference values may be variably set in accordance with the vehicle speed of the target vehicle, for example, so as to decrease as the vehicle speed of the target vehicle increases.

Further, it may be determined whether or not the target vehicle 102 has accelerated before or after S24, for example, based on the change in the vehicle speed V of the target vehicle, the front-rear acceleration of the target vehicle, or the operation amount sensor of the driving operation sensor 60 based on the operation amount of the accelerator pedal. If the acceleration determination is made prior to S24, the control proceeds to step 24 if an affirmative determination is made, and if a negative determination is made, the control may proceed to step 28. If the acceleration determination is made after S24, the control proceeds to step 26 if an affirmative determination is made, and the control may proceed to step 28 if a negative determination is made.

What is claimed is:

1. A travel control device comprising:
a camera configured to capture an image of surroundings of a target vehicle;
an automatic braking device configured to automatically brake the target vehicle; and
a processor configured to
acquire information on one of a curvature and a curvature radius of a traveling road ahead of the target vehicle based on the acquired information,
calculate a target vehicle speed of the target vehicle based on the information,
determine whether a vehicle speed of the target vehicle exceeds the target vehicle speed, and
in a case where a determination is made that the vehicle speed of the target vehicle exceeds the target vehicle speed, execute automatic deceleration on the target vehicle by the automatic braking device to control the vehicle speed of the target vehicle to reach the target vehicle speed,
wherein the processor is configured to
suppress execution of the automatic deceleration in a case where the processor estimates that a driver of the target vehicle traveling on a first lane is to overtake a preceding vehicle from a second lane adjacent to the first lane,
determine, based on information that is acquired from the captured image, whether the target vehicle returns from the second lane to the first lane and travels in front of the preceding vehicle for a predetermined period or more, while suppressing the execution of the automatic deceleration, and
terminate suppression of the execution of the automatic deceleration in a case where a determination is made that the target vehicle returns from the second lane to the first lane and travels in front of the preceding vehicle for the predetermined period or more.

2. The travel control device according to claim 1, wherein the execution of the automatic deceleration is suppressed by correcting the target vehicle speed to increase.

3. The travel control device according to claim 2, wherein
the target vehicle speed is corrected to increase by adding a correction amount to the target vehicle speed, and
the correction amount is set in accordance with the vehicle speed of the target vehicle.

4. The travel control device according to claim 2, wherein
the target vehicle speed to increase is corrected by multiplying the target vehicle speed by a correction coefficient larger than 1, and
the correction coefficient is set in accordance with the vehicle speed of the target vehicle.

5. The travel control device according to claim 1, wherein an estimation is made that the driver is to overtake the preceding vehicle in a case where the processor determines that the preceding vehicle is present within a predetermined distance range ahead of the target vehicle and that a blinker lever is operated by the driver toward the second lane where the driver is to overtake the preceding vehicle.

6. The travel control device according to claim 1, wherein the processor is further configured to terminate the suppression of the execution of the automatic deceleration in a case where an elapsed period from a time point at which the processor estimates that the driver is to overtake the preceding vehicle is equal to or larger than a reference value.

7. The travel control device according to claim 1, wherein
the processor is further configured to determine that the driver performs an operation of a latter half of overtaking of the preceding vehicle in a case where a blinker lever is operated by the driver in a direction from the second lane to the first lane, and
after determining that the driver performs the operation of the latter half of the overtaking of the preceding vehicle, the determination is made on whether the target vehicle returns from the second lane to the first lane and travels in front of the preceding vehicle for the predetermined period or more.

* * * * *